O. CHRISTENSON.
CENTERING PUNCH.
APPLICATION FILED APR. 12, 1913.
1,078,770.
Patented Nov. 18, 1913.
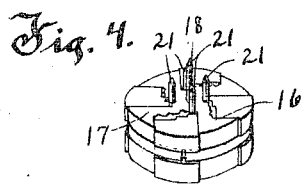
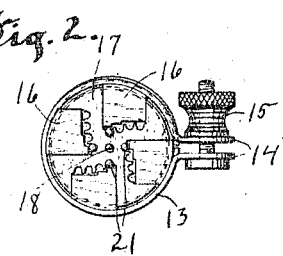
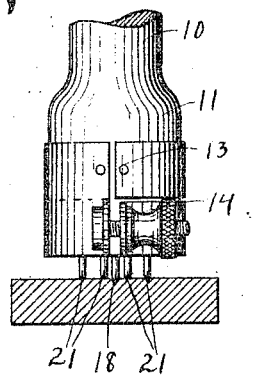
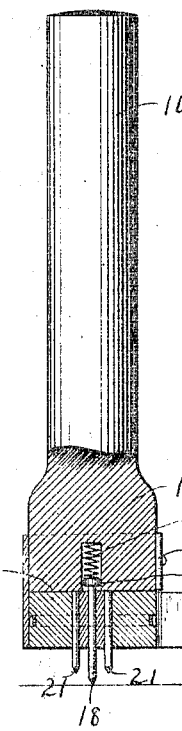
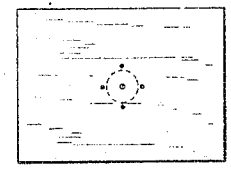
WITNESSES.
Arthur F Miller.
Katherine Holt
INVENTOR.
Oscar Christenson
By Morsell & Caldwell
ATTORNEYS.

UNITED STATES PATENT OFFICE.

OSCAR CHRISTENSON, OF MILWAUKEE, WISCONSIN.

CENTERING-PUNCH.

1,078,770.  Specification of Letters Patent.  Patented Nov. 18, 1913.

Application filed April 12, 1913. Serial No. 760,640.

*To all whom it may concern:*

Be it known that I, OSCAR CHRISTENSON, a citizen of the United States, and a resident of Milwaukee, in the county of Milwaukee and State of Wisconsin, have invented new and useful Improvements in Centering-Punches, of which the following is a description, reference being had to the accompanying drawings, which are a part of this specification.

This invention relates to centering punches for laying out work for the boring machine and has for its object to simplify the operation of forming guide marks for centering the drill.

Heretofore it has been customary in laying out work for the boring machine to surround the point indicating the center of the opening to be drilled with four other points on cross lines through the center point, such four points being measured with the dividers so as to be equidistant from the center point and then more clearly marked with a prick punch to serve as a guide for centering the drill. The first contact of the drill with the work obliterates the center mark so that if the position of the work with relation to the drill is not accurate the four equi-distant marks from the center point indicate that fact by showing the circle being cut by the drill to be nearer to some points than the others. This enables the operator to withdraw the drill and change the position of the work with relation to it until the circle of the cut of the drill appears to be at the same distance from all of the four guide marks, when it is known that the work is in proper position with relation to the tool to have the opening accurately drilled therein. This operation of marking the cross lines, measuring the equi-distant guide marks and punching them requires considerable time and if not carefully done admits of more or less inaccuracy.

The object of the present invention is to dispense with the necessity for this careful measurement and provide a tool which will produce the four guide marks accurately positioned equi-distant from the center mark by a single quick operation, as simple as the making of the center mark itself.

Another object of this invention is to perfect details of construction of a centering punch of this character.

With the above and other objects in view the invention consists in the centering punch as herein claimed and all equivalents.

Referring to the accompanying drawings in which like characters of reference indicate the same parts in different views: Figure 1 is a sectional elevation of a centering punch constructed in accordance with this invention; Fig. 2 is an end view thereof; Fig. 3 is a view showing the punch in operation, the work being sectioned to show marks produced by the punch; Fig. 4 is a perspective view of the punch retaining blocks banded together ready for insertion in the clamping belt of the punch head; and, Fig. 5 is a view showing the marks as produced by the punch of this invention.

In these drawings 10 indicates a punch shank having a head 11 which terminates in a flat face 12 and is surrounded by a clamping belt 13. The clamping belt 13 is of flexible sheet metal, preferably brass, with its lower part which extends beyond the face of the punch head slotted part way around and having projecting ears 14 connected by a clamping screw 15 for contracting it around a set of clamping blocks 16. The clamping blocks 16 have parallel side walls forming bearing guides by which they slide in radial grooves provided for them in a cross-shaped centerpiece 17 and the centerpiece with the clamping blocks assembled forms a cylindrical body to fit within the cylindrical clamping belt 13. At the center of the centerpiece 17 there is an opening through which a center pin 18 passes, there being a head 19 at the upper end of the center pin which enters a recess in the punch head containing a coil spring 20 which bears on the head of the center pin to press it outwardly, but permitting it to recede. The inner ends of the clamping blocks 16 are preferably stepped in formation and the openings of the centerpiece in which they fit are correspondingly shaped and are notched or grooved to form clamping seats at various distances from the center pin 18 to receive punch pins 21 which are of the same length and are pointed on their outer ends while their inner ends bear against the flat face of the punch head. In any of the corresponding positions of the punch pins they are diametrically opposite each other and equi-distant from the center pin 18 and the clamping action of the clamping belt 13, serves to clamp them rigidly in place by pressure against the clamping blocks 16. For convenience in handling the clamping blocks and centerpiece when removed from the clamping belt they are provided with a groove which extends entirely around the cylindrical body and a split ring or retaining band 22 fits within this groove and holds the parts together though permitting of their being readily separated if desired.

In operation it is only necessary to insert the center pin 18 in the recess formed by the prick punch at the point where the opening is desired and then strike the shank 10 with a hammer when the four punch pins 21 will be driven into the work and produce the guide marks equi-distant from the center mark for use in the same manner as before in properly positioning the drill with relation to the work to produce the opening at the desired point.

A material saving in time is effected by the use of this tool and the work is more accurately done, for the position of the punch pins in any adjustment thereof may be more accurately determined than by the ordinary method and these positions being fixed apply to all operations of the tool.

When it is desired to alter the adjustment of the punch pins for use in marking the work for larger or smaller drills it is only necessary to loosen the clamping bolt 15 and withdraw the punch pins 21 from one notch and insert them in another. If a corresponding adjustment is made in all of the pins they will always remain equi-distant from the center pin and diametrically opposite each other throughout their adjustments for different sizes of drill openings.

What I claim as new and desire to secure by Letters Patent is:

1. A centering punch, comprising a punch body, a center pin thereon, said punch body having punch pin seats positioned around the center pin equi-distant therefrom with radial openings leading thereto, punch pins fitting in the punch pin seats, clamping blocks slidably mounted in the radial openings and bearing against the punch pins, and a clamping member surrounding the punch body and engaging the clamping blocks for forcing them against the punch pins.

2. A centering punch, comprising a punch body, a centering pin thereon, there being a plurality of series of grooves in the punch body forming punch pin seats around the center pin with the respective punch pin seats of each series at different distances from the center pin and the corresponding punch pin seats of the several series equi-distant from the center pin, there being radial openings in the punch body leading to the respective series of punch pin seats, punch pins fitting in corresponding punch pin seats of the several series, clamping blocks slidably mounted in the radial openings, and a clamping member surrounding the punch body and engaging the clamping blocks for forcing them against the punch pins.

3. A centering punch, comprising a shank having a punch head at its end, a clamping belt secured to the punch head having a free portion forming an annular clamp, a clamping screw connecting the ends of the free portion of the clamping belt, a centerpiece fitting within the clamping belt and bearing against the end of the punch head, a center pin slidably mounted through an opening in the center of the centerpiece and having a head on its end extending into an opening in the punch head, a spring in said opening of the punch head bearing on the head of the center pin for forcing the center pin outwardly, there being radial openings in the center piece containing stepped grooves forming series of punch pin seats, the respective punch pin seats of each series being spaced at different distances from the center pin and the corresponding punch pin seats of the several series being equi-distant from the center pin, clamping blocks fitting within the radial openings and bearing against the punch head and engaged by the clamping belt, punch pins fitting in corresponding punch pin seats of the several series of punch pin seats and clamped in place by the clamping blocks and engaging the end of the punch head, there being an annular groove around the centerpiece and the clamping blocks, and a spring retaining band within the annular groove.

In testimony whereof, I affix my signature, in presence of two witnesses.

OSCAR CHRISTENSON.

Witnesses:
 KATHERINE HOLT,
 EMILY SCHOWALTER.